United States Patent [19]
Hamelin

[11] 3,838,891
[45] Oct. 1, 1974

[54] MONITORING CIRCUIT FOR AN ELECTRONIC BRAKING SYSTEM

[75] Inventor: Gilbert Hamelin, Marly-la-Ville, France

[73] Assignee: Societe Anonyme D.B.A., Paris, France

[22] Filed: Mar. 9, 1973

[21] Appl. No.: 339,792

Related U.S. Application Data

[62] Division of Ser. No. 154,485, June 18, 1971, abandoned.

[30] Foreign Application Priority Data
June 22, 1970 France .............................. 70.22929

[52] U.S. Cl. .......... 303/21 AF, 324/73 R, 340/52 B
[51] Int. Cl. ................................................ B60t 8/00
[58] Field of Search .............. 303/21; 324/51, 73 R; 340/52 R, 52 B, 213, 248 P, 410

[56] References Cited
UNITED STATES PATENTS

| | | | |
|---|---|---|---|
| 3,275,384 | 9/1966 | Hirzel............................... | 303/21 CG |
| 3,350,580 | 10/1967 | Harrison.......................... | 340/248 P |
| 3,412,388 | 11/1968 | Barton et al...................... | 340/248 P |
| 3,516,715 | 6/1970 | Fielek, Jr. et al................. | 303/21 AF |
| 3,535,004 | 10/1970 | Howard et al..................... | 303/21 EB |
| 3,598,452 | 8/1971 | Clifford et al.................... | 303/21 CG |
| 3,653,727 | 4/1972 | Kullberg et al.................... | 303/21 P |
| 3,706,971 | 12/1972 | Okamoto et al............ | 303/21 AF X |

*Primary Examiner*—George E. A. Halvosa
*Assistant Examiner*—Stephen G. Kunin
*Attorney, Agent, or Firm*—Ken C. Decker; William N. Antonis

[57] ABSTRACT

Monitoring circuit for an electronic system such as an adaptive vehicle braking system, in which at least one signal processing chain has an input connected to a source of signals having a variable frequency. A switch is periodically controlled to the conducting state to connect the input of the signal processing chain to ground, thus producing a disturbance which is felt as a sharp decrease in the frequency of the input signal representative of a decrease of the wheel speed in the case of an adaptive braking system. Simultaneously, a delayed action warning device is energized, the operation of this device being delayed by a time longer than the response time of the chain. If the system is in good operating condition the utilization device connected to the output of the processing chain will receive a control signal. This signal is used for resetting the switch and for stopping the energization of the delayed action warning device. In the occurrence of a failure, the control signal will not be received and the warning device will trigger an alarm.

5 Claims, 2 Drawing Figures

MONITORING CIRCUIT FOR AN ELECTRONIC BRAKING SYSTEM

This is a division, of application Ser. No. 154,485, filed June 18, 1971, now abandoned.

This invention relates to a circuit for monitoring an electronic system supplied with input signals having a variable frequency, such as the electronic system of an anti-skid device for vehicle braking system.

It is known that the anti-skid devices are useful for controlling hydraulic or pneumatic pressures applied to the vehicle brakes, so that a loss of braking efficiency and a loss of directional control will not result from an application of the brakes causing the wheels to lock, particularly in a panic braking on a slippery road.

The electronic system of anti-skid devices comprises at least one functional chain which is controlled by signals having a variable frequency representative of the vehicle wheel rotation speed. At the input of each functional chain, a frequency to voltage converter associated to each wheel converts into voltage variations, the frequency variation of these signals, and solenoids are controlled by a signal processing circuit to periodically isolate the braking system from the pressurized fluid supply in response to deceleration and acceleration values obtained from the measured values of the wheel speed.

The anti-skid devices have an action on circuits which are essential for the vehicle security. Thus, they must be so devised that an abscence of braking cannot be occasioned by a failure in their operation. Consequently, the construction of anti-skid devices is in compliance with the usual rules of security which, among other items, recommend a redundancy of some functions, permanent monitoring of various elements such as the solenoids, and control over the battery condition. It would be desirable that these local checking operations should be supplemented by an overall monitoring process which, without affecting the normal operation of the vehiucle, would generate signals similar to those occuring when the brakes are applied to verify that the various elements of the system are properly responding to the signals.

However, the manufacture of a circuit allowing an overall monitoring raises problems which have not yet been solved by simple means, since it is not easy to produce monitoring signals having as the speed signals a random frequency variation, and also since the monitoring signals must be applied without opening or otherwise modifying the electronic system of a conventional anti-skid device. The need for an overall monitoring circuit is not limited to the use in an anti-skid device, and an similarly arises in other electronic systems, such as signalling systems or machine control systems in which the input signals are frequency modulated and then converted into amplitude modulated signals.

The invention solves these problems by providing a monitoring circuit in which switching circuit simultaneously controls the operation of a timing circuit and the closure of a switch connecting to ground the input of the functional chain in the electronic system, to create a disturbance causing the functionel chain to deliver a response signal which is transmitted to the switching circuit for resetting said circuit in a state controlling the opening of said switch and the de-energization of said timing circuit. A fault in the functional chain would result in the abscence of a response signal. Consequently, the switching circuit would not be reset and the continued operation of the timing device will trigger a warning device after a predetermined delay.

The invention will now be described by way of example with reference to the appended drawings in which.

Figure 1:
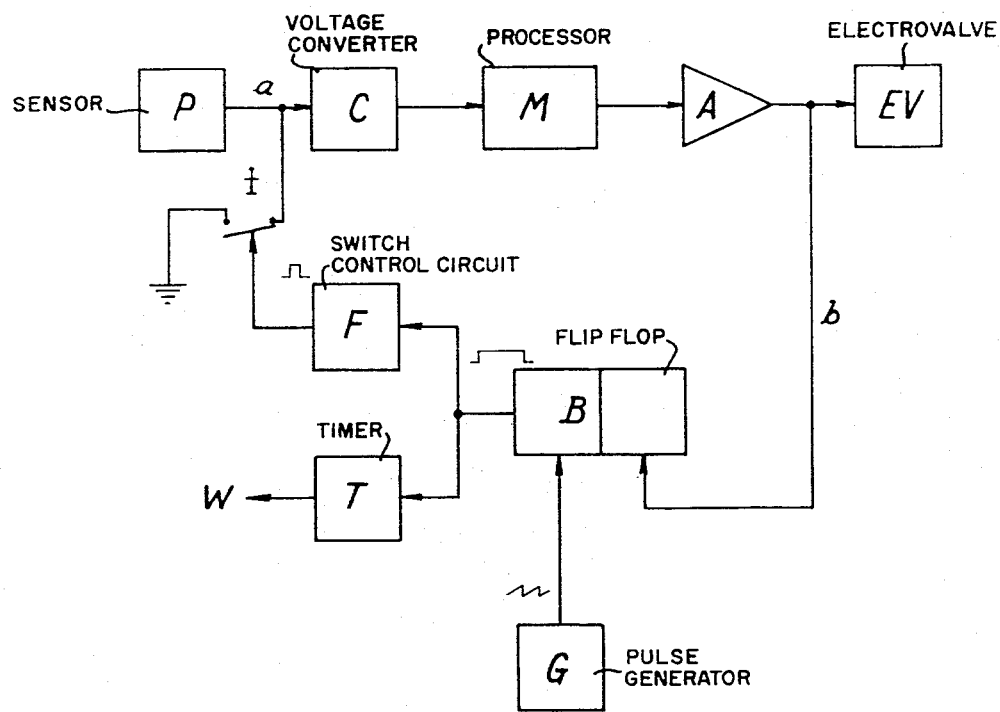
FIG. 1 is a block-diagram of monitoring circuit according to the invention.

As shown in its simplest form in FIG. 1, an electronic system to which the monitoring circuit of the invention can be applied comprises a sensor P which delivers signals having a variable frequency to a frequency to voltage converter C. If the system is an anti-skid device, the sensor P detects the speed of one of the wheels of a vehicule. The output signals of the converter C are treated in a signal processing circuit M in accordance with a complex function of their levels and level variations. The output signals of the processing circuit M are applied through an amplifier A to the control element EV of an apparatus which is generally the solenoid of an electrovalve in the case of an anti-skid device.

The monitoring circuit of the invention comprises a time signal generator G which, for instance, produces a pulse every minute. The pulses are applied to the first input of a fip-flop B and each pulse switches the flip-flop from a (0) state producing no output signal to a (1) state producing a constant level output signal. The output of the flip-flop B is connected both to a circuit F controlling a switch I, and to a timing device T. Switch I is connected between the ground and the line $a$ connecting sensor P to converter C. The output of the timing circuit T is connected to a warning device W. The second input of flip-flop B is connected by a line $b$ to the solenoid EV.

In the operation, a pulse from generator G causes the flip-flop B to shift to the (1) state and deliver an output signal which simultaneously triggers the timing circuit T and the circuit F controlling switch I. The output signal of the circuit F is a pulse which controls the closure of switch I for a time equal or slightly longer than the response time of the electronic system which is being monitored.

The closure of switch connects line $a$ to ground, thus causing the output signal of sensor P to decrease sharply in level. This decrease in level is interpreted as a decrease in frequency by the converter C. It will be noted that the converter is of a conventional type including a clipper stage and a discriminator stage. The output signals of this converter are conditioned only by the frequency of the input signals as long as the level of the input signals is above the clipping level, but both by the level and the frequency when the level of the input signal is below the clipping level. Hence, a sharp level decrease of the input signal causes the output signal to experience a variation which is similar to the variation obtained in response to a sharp decrease in the vehicle speed. Consequently, the disturbance caused by the closure of switch I is interpreted as a decrease in the vehicle speed by the processing circuit M, and it results in the solenoid EV being controlled according to the operating process of the electronic system, provided that this system is in good operating condition. If this is actually the case, the control signal of the solenoid EV will be applied via line b to the second input of the flip-flop B, and the flip-flip will be reset to its (0) state. Thus, the flip-flop had remained only for a brief period of time in the (1) state, practically during a period equal to the response time of the electronic system. It will be noted that the return of the flip-flop to its (0) state will stop the timing device before the timing device would have triggered the warning device W.

However, if the electronic system does not operate correctly, the solenoid EV and the second input of the flip-flop B will receive no signal, and the flip-flop will remain in its (1) state After a predetermined delay, the timing device T will then trigger the warning device W to indicate a failure in the electronic system It can been seen that the monitoring circuit of the invention efficiently and permanently checks the overall operation of the electronic system. It will be noted, for example, that monitoring circuit checks the operation of the sensor P and of the circuitry between the sensor and the converter, since the closure of the switch I would not produce the desired disturbance if the converter C did not receive the signals of the sensor P.

As a variant, the second input of the flip-flop B can be connected to a contact (not shown) controlled by the solenoid EV, instead of being connected to the solenoid itself. Thus the operation of the apparatus utilizing the solenoid EV, is actually checked.

Figure 2:
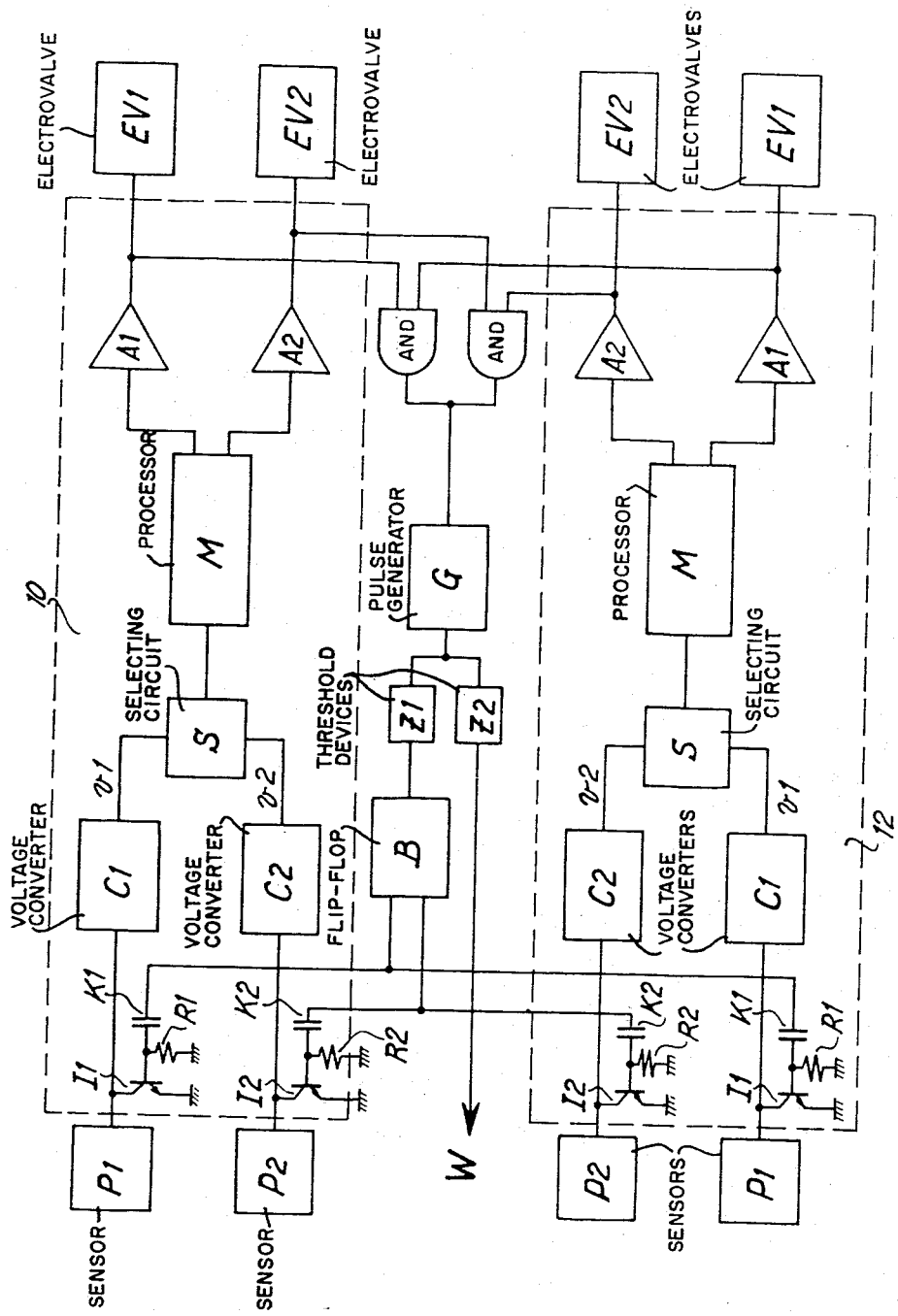
FIG. 2 is a diagram illustrating the application of the monitoring circuit to the electronic system of an anti-skid device.

FIG. 2 is a more elaborate diagram of a monitoring circuit associated to an anti-skid device for a braking system. The anti-skid device includes two similar chains 10, 12 referred to as functional chains, one associated to the front axle and the other to the rear axle of a vehicle. Only one chain will be described, and like elements in both chains will be designated by the same reference indices.

Each vehicle wheel is provided with a wheel speed sensor P1, P2 delivering signals whose frequency is a function of the wheel speed. Each sensor is connected to a frequency to voltage converter C1, C2 delivering constant level signals V1, V2, representative of the wheel speed. Generally, the slower wheel on each axle controls the anti-skid process. A circuit S selects the lower of the voltages V1, V2, and this voltage is applied to the input of the signal processing circuit M, the output of this circuit being connected through power stages A1, A2 to the solenoids EV1, EV2.

The input of each converter is connected to a grounded switch I1, I2. This switch can be constituted by the emitter-collector circuit of a transistor.

It will be recognized that the elements P1, C1, I1, . . . are associated to the right-hand side of the vehicule, while the elements P2, C2, I2, . . . are associated to the eft-hand side. In the particular form represented in FIG. 2, the monitoring circuit of the invention comprises the following elements:

a flip-flop B having one input and two output teminals; one of the outputs is in the (1) state when the other output is in the (0) state, and the state of the outputs changes every time a pulse is applied to the input. Through capacitors K1, K2, each output is simultaneously connected to the switches I1 in either of the functional chains 10, 12;

a saw tooth generator G supplies, on the one hand, the input of flip-flop B through a first threshold device Z1, and, on the other hand, a warning device W through a second threshold device Z2 having a higher threshold level;

a resetting circuit for the flip-flop including a pair of two-input AND gates having their outputs connected to the generator G each gate having its inputs connected to the outputs of the amplifiers A1 in either chain 10, 12 respectively.

In the operation, assuming that the initial voltage level of a saw-tooth from generator G is close to zero, this voltage will after a period of time of one minute for example, reach a threshold level Z1, and initiate the production of a pulse which will modify the state of the flip-flop B.

If transistors are used as switches I1, I2, they can be readily controlled by the pulses issuing from one or the other of the flip-flop outputs as the state of the flip-flop changes. Transmitted through capacitors K1, K2, each pulse causes one transistor I1, in either chain to be switched to the conducting state, thus producing an important drop in the level of the speed signal at the input of the corresponding converters C1. The duration of the level drop is determined by the time constant of the circuits comprising the capacitors K1, K2, and the resistors R1, R2. The time constant will be chosen such that the period during which the transistors are in the conducting state should be somewhat longer than the response time of the functional chains.

If the anti-skid device is operating correctly, the control signals for the solenoids such as EV1 in either functional chain will appear almost simultaneously at the outputs of the power stages A1 and consequently at the inputs of one of the gates AND. These signals will open the gate to reset the voltage of generator G to a level close to zero.

A new cycle will then begin but, since the state of the flip-flop will change, the transistors I1 which will be switched to the conducting state are on the side of the vehicle which has not been subjected the previous test. Thus, both functional chains will be tested at the end of two cycles.

If the operation of one of the functional chain is defective, no control signals will be received by the solenoids and the resetting of the generator saw-tooth voltage will not occur. The level of the saw-tooth voltage will keep rising and upon reaching the threshold level Z2, it will fire the alarm W. A minor modification of the circuit could be made for allowing the saw-tooth voltage to be reset to zero after having passed the threshold level Z2, and for firing the alarm after a few threshold attainments. The alarm is then operative to achieve the necessary protection, particularly to inform the driver and to inhibit the anti-skid device from further action on the braking system.

It will be noted that the monitoring circuit checks not only the operation of the anti-skid device, but also its own operation. In effect, if the test signal does not reach the input of a chain, the saw-tooth voltage from generator G will keep rising and fire the alarm.

However, it is necessary to eliminate the action of the monitoring circuit at low speed of the vehicle since the disturbances resulting from the closure of switches I1, I2 would be too weak to energize the measuring elements in the signal processing circuit M. The test cycle would then remain unachieved, and it would wrongfully be interpreted as a failure.

The elimination of the monitoring action at low speeds can be obtained by checking the levels of the signals V1, V2 at the output of the selecting circuit S. If the levels are below a predetermined value, the charge of the capacitor used for creating the saw-tooth voltage in generator G will be interrupted, and the monitoring circuit will be functioning only above a predetermined speed of the vehicle.

During a brake application, it is preferable to interrupt the monitoring action, so as to avoid the superposition of monitoring signals on normally existing signals. In a manner similar to the elimination of the monitoring action at low speeds, the charge of the capacitor will be interrupted during the braking periods, for instance by using the switch of the stop light existing on every vehicle.

What is claimed is:

1. An adaptive braking system for a vehicle having a wheel and a brake for controlling said wheel, said system comprising:

first signal generating means for generating a speed signal proportional to the rotational velocity of said wheel;

electrically operated valve means for controlling actuation of said brake;

circuit means having input terminal means connected to said first signal generating means and output terminal means connected to said electrically operated valve means, said circuit means being responsive to said speed signal to generate an output signal actuating said valve means when an incipient skidding condition is sensed;

switching means connecting the output of said first signal generating means to an electrical ground;

a warning device; and second signal generating means periodically generating a signal closing said switching means to connect the output of said first generating means to the electrical ground to thereby create an electrical disturbance actuating said circuit means, the signal generated by said second signal generating means also actuating said warning device after a time delay at least equal to the response time of said circuit means;

said second signal generating means including means connected to the electrically operated valve means and responsive to actuation of the latter to extinguish the signal generated by the second signal generating means, whereby said warning device is not actuated unless the time period between closure of said switching means and actuation of said valve means exceeds said time delay.

2. The invention of claim 1:

said second signal generating means generating a signal the magnitude of which increases as a function of time;

said second signal generating means including a first threshold connected between the output of said signal generating means and said switching means for closing the latter when the output of said signal generating means increases to a first predetermined value, a second threshold connected between the output of said signal generating means and said warning device for actuating the latter when the output of said signal generating means increases to a second predetermined value which is substantially higher than the first predetermined value, the time required for the signal generated by said signal generating means to increase from said first value to said second value being at least equal to the response time of said circuit means.

3. The invention of claim 2:

said switching means including means for reopening said switching means a predetermined time period after closure by generation of said signal by said second signal generating means.

4. An adaptive braking system for a vehicle having at least four wheels and brakes for controlling each of said wheels comprising:

first generating means for each of said wheels for generating a speed signal proportional to the rotational velocity of the corresponding wheel;

electrically operated valve means for each of said brakes for controlling actuation of the corresponding brake;

circuit means for each pair of wheels, said circuit means having input terminal means connected to corresponding first generating means and output terminal means connected to corresponding valve means, said circuit means including means for selecting the signal generated by one of the corresponding first generating means and generating an output signal actuating the corresponding valve means when an incipient skidding condition of the wheel corresponding to the selected signal is sensed;

switching means including a switch for each of said first generating means, each of said switches being connected between the output of a corresponding first generating means and an electrical ground;

a warning device;

second signal generating means having an output connected to said warning device and to each of said switches, said second signal generating means generating a signal closing at least some of said switches to connect the latter with said electrical ground to create an electrical disturbance actuating a corresponding circuit means, the signal generated by said second signal generating means also actuating said warning device after a time delay at least equal to the response time of said circuit means;

said second signal generating means including means connected to the corresponding electrically actuated valve means and responsive to actuation of said valve means to extinguish the signal generated by the second signal generating means, whereby said warning device is not actuated unless the time period between closure of said switching means and of said corresponding valve means exceeds said time delay.

5. The invention of claim 4; and logic circuitry having an input connected to the output of said second generating means and a pair of outputs, one of said outputs being connected to some of said switches and the other output being connected to the remaining switches;

said logic circuitry alternating the output which is actuated each time said signal is generated by said second signal generating means.

* * * * *